United States Patent [19]

Vesely et al.

[11] Patent Number: 5,003,680
[45] Date of Patent: Apr. 2, 1991

[54] TOOL FOR FITTING AND REMOVING BRAKE SHOE RETURNS SPRINGS

[75] Inventors: Ivan Vesely, Holzkirchen; Xaver Kreitmair, Dachau, both of Fed. Rep. of Germany

[73] Assignee: MAN Nutzfahrzeuge GmbH, Munich, Fed. Rep. of Germany

[21] Appl. No.: 520,834

[22] Filed: May 8, 1990

Related U.S. Application Data

[63] Continuation of Ser. No. 274,188, Nov. 18, 1988, abandoned.

[30] Foreign Application Priority Data

Nov. 28, 1987 [DE] Fed. Rep. of Germany ....... 3740465

[51] Int. Cl.⁵ .............................................. B23P 19/04
[52] U.S. Cl. ...................................... 29/227; 294/17; 29/267
[58] Field of Search ................ 29/227, 267; 254/10.5, 254/116, 129–131; 294/17

[56] References Cited

U.S. PATENT DOCUMENTS

| | | | |
|---|---|---|---|
| 990,387 | 4/1911 | Plant | 294/17 |
| 1,829,490 | 10/1931 | Parish | 294/17 |
| 2,685,731 | 8/1954 | Vertin . | |
| 3,257,716 | 6/1966 | Spy et al. | 29/267 |
| 4,276,684 | 7/1981 | Mattson | 29/227 |

FOREIGN PATENT DOCUMENTS

| | | | |
|---|---|---|---|
| 463941 | 7/1928 | Fed. Rep. of Germany | 254/129 |
| 56-7134 | 1/1982 | Japan | 29/227 |

*Primary Examiner*—J. J. Hartman
*Attorney, Agent, or Firm*—Ladas & Parry

[57] ABSTRACT

A universal tool for the fitting and removal of brake shoe return springs of trucks, truck trailers and omnibuses in the form of a slender bar which may be used as a first, second or third class lever and has at least one draw hook member pivoted thereon so as to be able to swing through an angle of at least 90° in relation to the lever. The lever furthermore bears a spur and its distal or outer end is in the form of a hook.

16 Claims, 4 Drawing Sheets

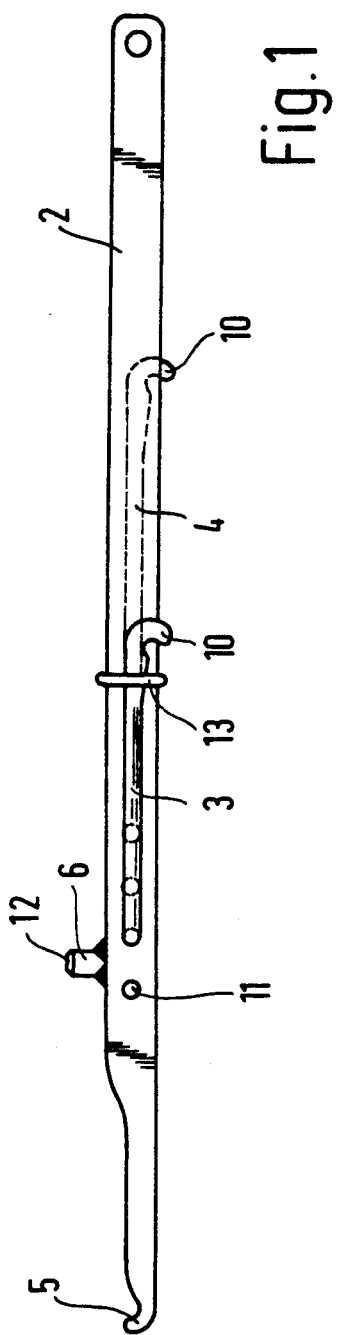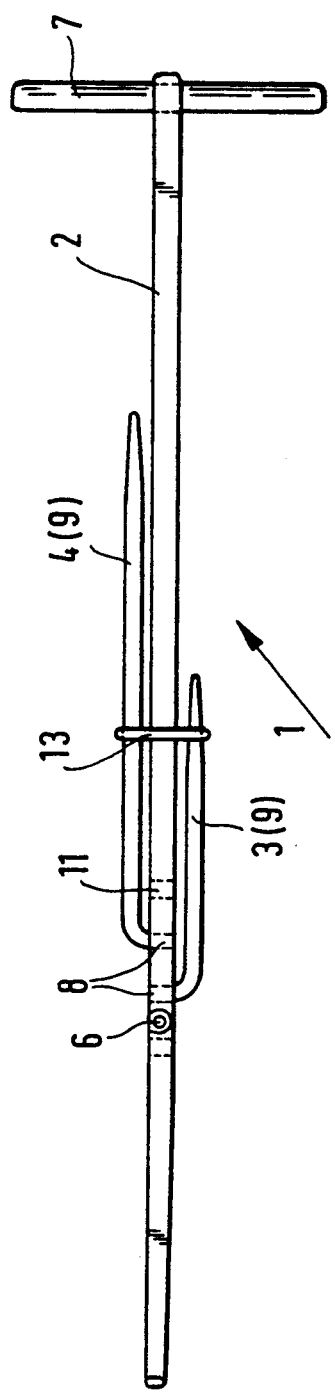

TOOL FOR FITTING AND REMOVING BRAKE SHOE RETURNS SPRINGS

This is a continuation of copending applicatin Ser. No. 07/274,188 filed on Nov. 18, 1988 now abandoned.

BACKGROUND OF THE INVENTION

The invention relates to a tool for fitting and removing brake shoe return springs in the wheel hubs of commercial vehicles.

Owing to the lack of space and the resulting cramped arrangement of internal parts in the hub of a commercial vehicle whell and of the powerful force of the brake shoe return springs, the fitting and removal of the return springs is quite frequently a considerable problem. For different wheel sizes and different vehicle types and makes a large variety of fitting tools is used such as pliers, hooks and levers. Frequently, the removal and fitting of the shoe return springs is not possible without detaching the hub in order to find a point at which conventional tools may be brought to bear when manipulating the springs. In the case of one wheel this means about 1½ hours of fitter's time are required so that in the case of replacement of all the brake linings on a 4 wheel vehicle, at least 6 hours of fitter's time will be required. Furthermore the vehicle will be out of service for this time.

SUMMARY OF THE PRESENT INVENTION

One object of the present invention is to devise a fitter's tool of the initially mentioned type of universal application suitable for use with a multiplicity of different types of trucks, truck trailers and busses which is readily handled and is economical.

In order to achieve these or other objects appearing from the present specification and claims the tool is in the form of a slender lever able to be pivoted at different positions along the length thereof and to engage loads at different points on its length and has at least one draw hook mounted on it. Such a design means that one single tool may take the place of a plurality of tools as so far used for the fitting and removal of brake shoe return springs. Furthermore, owing to the improved positions of fulcruming the lever it is possible to work better in confined spaces with a large number of different types of lever action such as the action of a first or second class lever. If as in the prior art, a large number of tools is used for a single purpose there is a greater chance of a tool being mislaid, usually the one that is specifically required. On the other hand a single tool attracts more attention and will be better looked after. Owing to the slender design of the tool with its long lever arms it is possible to avoid having to dismount the wheel hub for removing and refitting brake shoe return springs, a saving, as noted, of 1 day of fitter's time. This results in a lower repair cost and a reduced out of service time for the vehicle.

In accordance with a preferred feature of the invention the tool consists of lever tapering in the part adapted to engage the load with a hooked end and the at least one draw hook may be pivoted about 90° in relation to the lever, a spur being arranged parallel to the hook and a handle at the proximal end of the lever (i. e. the end nearest the body of the fitter), such handle being arranged transversely to the lever. With this design the lever takes into account the cramped working conditions in the hub and adjacent to the brake mechanism. Owing to the arrangement of the handle placed perpendicular to the lever it is possible to ensure that the lateral shifting motion essential for removing and fitting a brake shoe return spring may be readily performed by using the long lever arm, with little effort.

In accordance with a further feature of the invention, there are two such draw hooks which are placed on either side of the lever and have different lengths and are accommodated in different planes aligned with the longitudinal extent of the lever. It is in this manner that the number of different possible lever configurations is further increased and thus the field of application widened.

The draw hooks may have cranked ends which are fitted into holes in the lever to pivot therewith, while the long arms of the draw hooks are the parts with the hooks at the ends. With these features the lever is narrow in design and when the draw hooks are used their end hooks may be used to grip the end coil of a brake return spring.

In accordance with another feature of the invention the draw hooks are screwed into the lever, this providing a cheap and simple way of attachment to the lever so that they may be swung away from the lever into the working positions and the range of application of the lever is still further increased.

If the lever is provided with more than one tapped hole for each draw hook, the leverage may be readily modified still further.

The invention may be further developed by having a feature in which for retaining the draw hooks in their inactive positions in which they extend in parallel to the lever there is an elastic ring. It is in this manner that the one or more draw hooks may be held on the lever so that they do not interfere with the use thereof in operations not requiring the participation of such hooks. The elastic ring may be an o-ring as used for sealing purposes and which is available almost everywhere at a very low price.

Further advantages and features of the invention will be seen from the following account of a working embodiment thereof as shown in the drawings.

BRIEF DESCRIPTION OF THE SEVERAL VIEWS OF THE FIGURES

FIG. 1 is a view of the embodiment of the invention as seen from the side.

FIG. 2 is a plan view thereof.

DETAILED DESCRIPTION OF THE INVENTION

Figure 3:
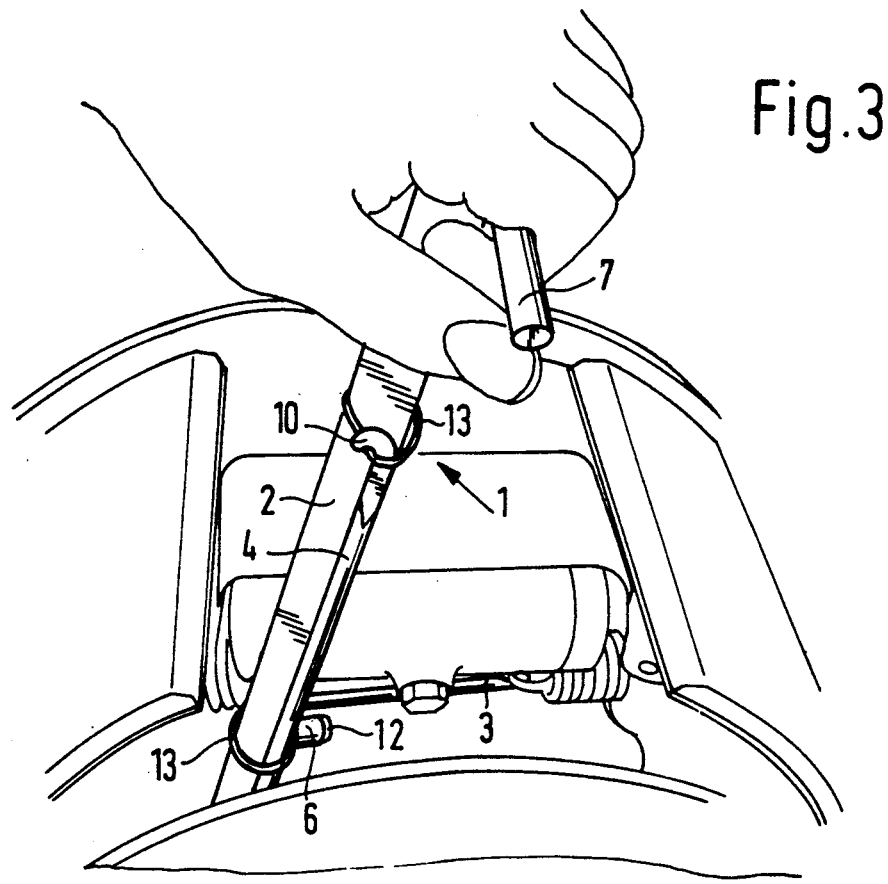
FIG. 3 shows the use of the tool to remove a brake shoe return spring.

The universal lever tool of the invention to be seen in FIGS. 1 and 2 is designed for the fitting and removal of brake shoe return springs. It comprises a lever 2 having draw hooks 3 and 4 whose short cranked ends 8 are screwed into tapped holes 11 in the lever and which have different lengths. On the top side of the lever there is a spur or head 6 fixedly mounted thereon. At its proximal end the lever 2 has a handle 7 and there is an o-ring 13 for holding the draw hooks 3 and 4 in inactive positions against the body of the lever. In its distal portion the lever 2 is tapered in two dimensions and at the distal end of such tapered part has a hook 5. The spur 6 is welded on the back of the lever 2 so as to be parallel to the hook configuration and spaced therefrom. The spur is preferably made of round steel and has an oblique face 12 at its outer end. The main parts 9 of the draw hooks 3 and 4 are, in the inactive positions thereof, parallel to the length of the lever 2 and are held thereagainst by an attachment element such as o-ring 13 The main parts 9 have the hook portions 10 at their ends remote from the lever and are tapered and flat at such hook portions. If one of the draw hooks is released from the elastic ring it may be used to engage a brake shoe return spring while the end of the lever 2 bears against an internal hub member. On removing the spring the fitter holding the handle will perform movements in two directions, that to say one pulling the lever towards him and a further motion acting to the side.

FIG. 3 shows the removal of a brake shoe return spring in the rear part of the hub. The fulcrum of the lever is formed at the hooked distal end 5 of the lever engaging the outer face of an internal hub member, while the short draw hook 3 has its hook part 10 in engagement with the shoe return spring. The spring is able to be removed by pulling and small lateral stroke of the lever imparted to the lever by way of the handle 7 by the fitter who has it in his hand.

Figure 4:
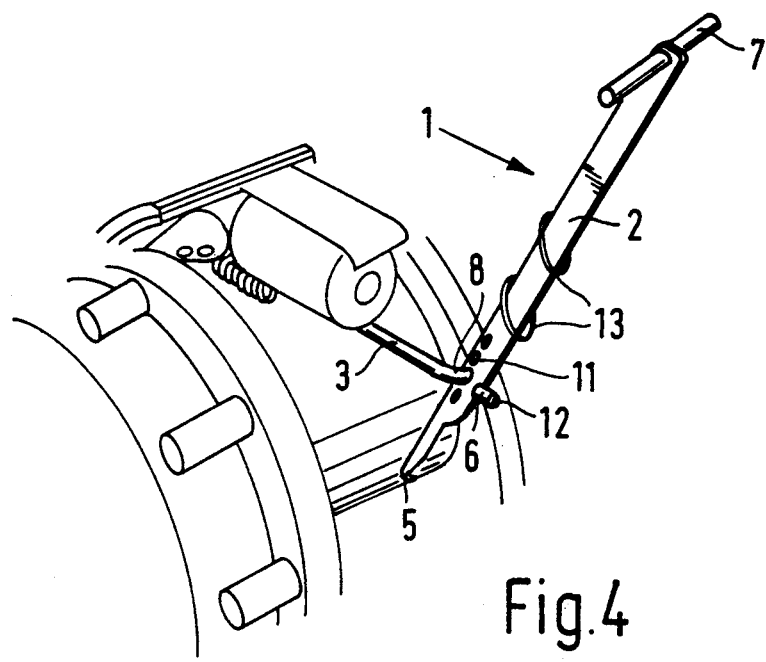
FIG. 4 shows the use of the tool with one draw hook released and in engagement with a spring.

FIG. 4 shows the use of the universal tool with one draw hook engaged with a brake shoe return spring so that the distal end of the lever 2 is fulcrumed on the hub and the long draw hook 4 is in engagement with the brake spring.

Figure 5:
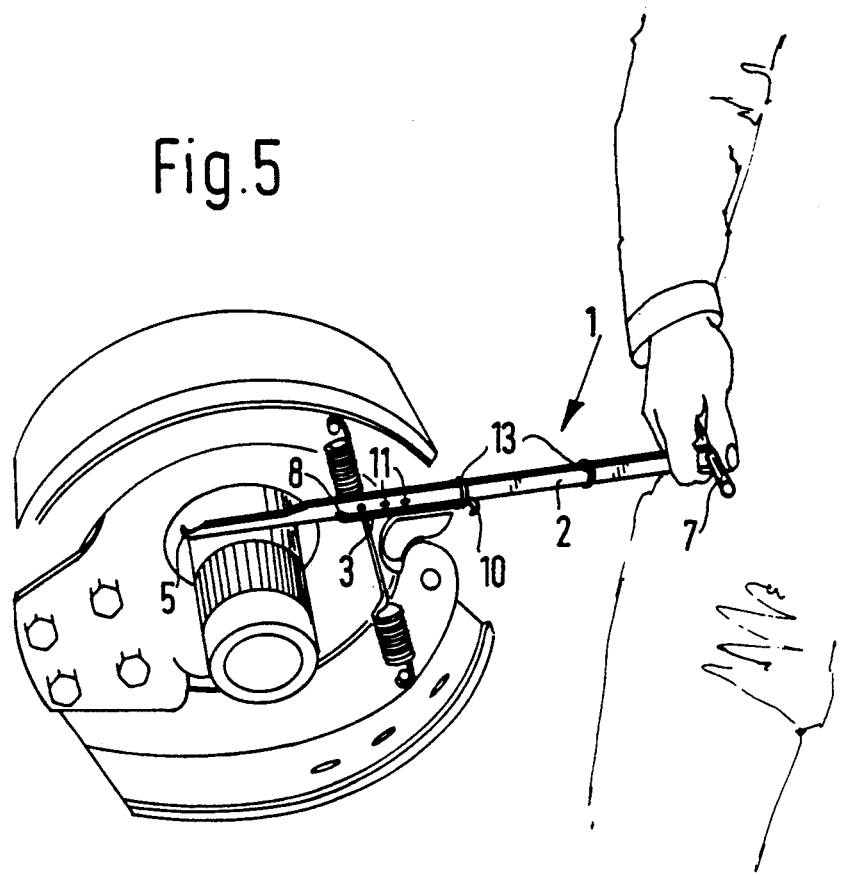
FIG. 5 shows the use of the tool as a second class lever.

In FIG. 5 the tool is being used as a second class lever with the distal or outer end of the lever 2 fulcrumed on the drive axle and the spur 6 fixed to the back of the lever 2 in engagement with the brake spring for disengaging it.

Figure 6:
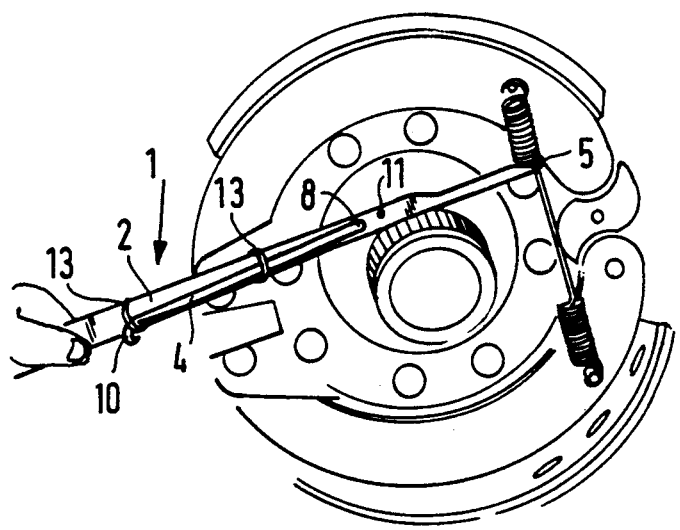
FIG. 6 shows an application in which the tool is used as a first class lever.

In FIG. 6 the tool is being used as a first class lever with its mid part fulcrumed on the drive axle and its hooked end 5 in engagement with the brake shoe return spring.

Figure 7:
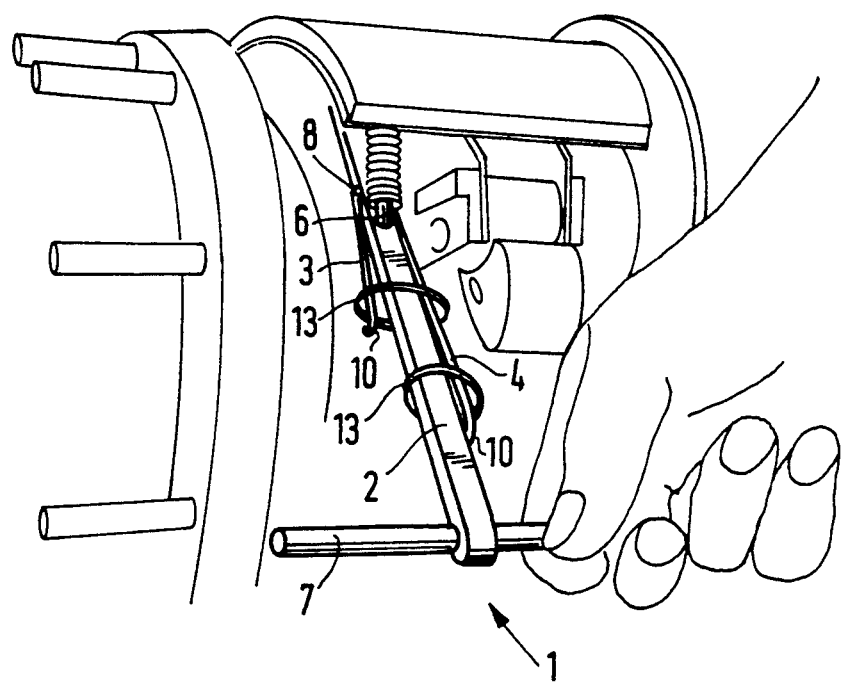
FIG. 7 shows the use of the tool with the spur thereon in engagement with a spring.

Lastly in FIG. 7 the lever will be seen engaging the spring by way of its spur, the draw hooks 3 and 4 being held in their inactive positions by means of o-rings 13.

What is claimed is:

1. A tool for the fitting and removal of brake shoe return springs in a vehicle, said tool comprising an elongated lever having opposite ends and opposite side surfaces, two draw hooks connectable to said lever respectively at the opposite side surfaces of the lever at two different locations for separate and independent pivotal movement about respective axes perpendicular to said lever through an angle of at least 90°, said lever including a hook at one of said ends, a spur on said lever, spaced from said hook and extending parallel to said hook, said hook and spur being selectively active to directly apply force to the brake shoe return springs, enabling said lever to act as a fulcrumed first and second class lever, said two draw hooks being of different lengths and disposed in planes parallel to said lever, means for selectively retaining the jaw hooks relative to said lever and handle means on said lever at the other end thereof extending perpendicularly to said lever.

2. A tool as claimed in claim 1 wherein said lever tapers in thickness from said spur towards said hook.

3. A tool as claimed in claim 1 wherein said draw hooks are connected to said lever at axially spaced locations along said lever.

4. A tool as claimed in claim 1 wherein each draw hook includes a short cranked end connected to said lever and a longer main part having an end portion with a hook thereon.

5. A tool as claimed in claim 4 wherein said end portion of each said draw hook tapers in thickness towards said hook thereof.

6. A tool as claimed in claim 1 wherein each draw hook is threadably connected to said lever.

7. A tool as claimed in claim 1 wherein said lever has an intermediate portion with a plurality of tapped holes therein extending along the length of said lever, said draw hooks being selectively threadably engageable enjoyable in said tapped holes.

8. A tool as claimed in claim 1 wherein said spur comprises a round pin.

9. A tool as claimed in claim 8 wherein said lever has a narrow edge on which said pin extends.

10. A tool as claimed in claim 9 wherein said pin is welded to said lever and has an oblique face.

11. A tool as claimed in claim 1 wherein said means for retaining comprises an elastic ring detachably engageable around the draw hooks and lever for releasealby holding the draw hooks parallel to the lever in an inactive position.

12. A tool as claimed in claim 1 wherein the lever and at least one of the draw hooks are forged.

13. A tool as claimed in claim 1 wherein said handle means extends substantially perpendicularly to said spur and said hook on said lever.

14. A tool as claimed in claim 13 wherein said handle means comprises a tubular handle member.

15. A tool as claimed in claim 1 wherein said hooks on the end portions of said draw hooks extend from their respective end portions in the same direction.

16. A tool as claimed in claim 1 wherein said draw hooks have ends with hooks thereon, said drawhooks being disposed adjacent to said lever in an inactive position, said spur being disposed between the hook on the lever and the hooks on the drawhooks when the drawhooks are in said inactive position.

* * * * *